US012743110B2

(12) United States Patent
Kitamura

(10) Patent No.: US 12,743,110 B2
(45) Date of Patent: Sep. 22, 2026

(54) TRANSPORTATION SYSTEM AND TRANSPORTATION CONTROL METHOD

(71) Applicant: Murata Machinery, Ltd., Kyoto (JP)

(72) Inventor: Wataru Kitamura, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 18/855,438

(22) PCT Filed: Feb. 28, 2023

(86) PCT No.: PCT/JP2023/007383
§ 371 (c)(1),
(2) Date: Oct. 9, 2024

(87) PCT Pub. No.: WO2023/199628
PCT Pub. Date: Oct. 19, 2023

(65) Prior Publication Data

US 2025/0341845 A1 Nov. 6, 2025

(30) Foreign Application Priority Data

Apr. 13, 2022 (JP) ................................ 2022-066474

(51) Int. Cl.
*G05D 1/698* (2024.01)
*G05D 1/667* (2024.01)
*G05D 105/28* (2024.01)

(52) U.S. Cl.
CPC .......... *G05D 1/6987* (2024.01); *G05D 1/667* (2024.01); *G05D 2105/28* (2024.01)

(58) Field of Classification Search
CPC .. G05D 1/6987; G05D 1/667; G05D 2105/28; G05D 1/698
See application file for complete search history.

(56) References Cited

U.S. PATENT DOCUMENTS

2011/0029233 A1* 2/2011 Carpenter ........ G08G 1/096861 701/533
2021/0149401 A1 5/2021 Kitamura
2021/0247762 A1* 8/2021 Park ........................ G06F 9/505
(Continued)

FOREIGN PATENT DOCUMENTS

JP 2000148242 A 5/2000
JP 3663726 B2 * 6/2005
JP 2014186377 A 10/2014
(Continued)

OTHER PUBLICATIONS

Official Communication issued in International Patent Application No. PCT/JP2023/007383, mailed on Oct. 24, 2024, 2 pages.
(Continued)

*Primary Examiner* — Roy Rhee
(74) *Attorney, Agent, or Firm* — Keating & Bennett, LLP

(57) ABSTRACT

A transportation system includes a plurality of transport vehicles and a controller configured or programmed to assign a transportation command to the transport vehicles and to execute specific assignment processing to preferentially assign the transportation command having a relatively short transportation time or transportation distance to the transport vehicles.

5 Claims, 5 Drawing Sheets

(56) References Cited

U.S. PATENT DOCUMENTS

2023/0322486 A1 10/2023 Takahara

FOREIGN PATENT DOCUMENTS

| | | | |
|---|---|---|---|
| JP | 2018052659 | A | 4/2018 |
| TW | 201813899 | A | 4/2018 |
| WO | 2022049929 | A1 | 3/2022 |

OTHER PUBLICATIONS

English translation of Official Communication issued in International Patent Application No. PCT/JP2023/007383, mailed on Apr. 25, 2023, 4 pages.
International Search Report in PCT/JP2023/007383, mailed Apr. 25, 2023, 2 pages.
Official Communication issued in corresponding European Patent Application No. 23788050.5, mailed on Feb. 20, 2026, 8 pages.

* cited by examiner

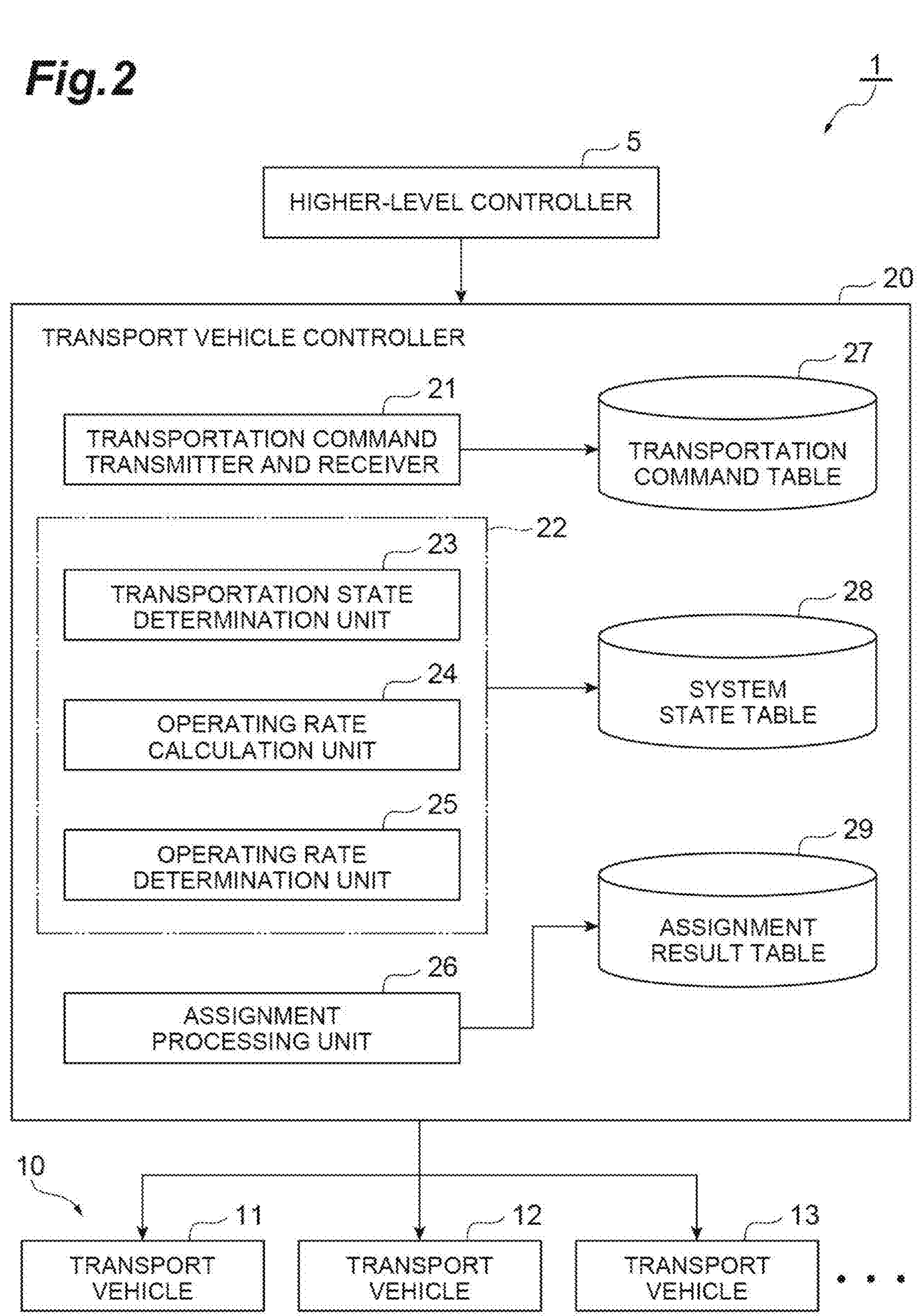
Fig.2
1
5
HIGHER-LEVEL CONTROLLER
20
TRANSPORT VEHICLE CONTROLLER
21
TRANSPORTATION COMMAND TRANSMITTER AND RECEIVER
27
TRANSPORTATION COMMAND TABLE
22
23
TRANSPORTATION STATE DETERMINATION UNIT
24
OPERATING RATE CALCULATION UNIT
28
SYSTEM STATE TABLE
25
OPERATING RATE DETERMINATION UNIT
29
ASSIGNMENT RESULT TABLE
26
ASSIGNMENT PROCESSING UNIT
10
11
TRANSPORT VEHICLE
12
TRANSPORT VEHICLE
13
TRANSPORT VEHICLE ASSIGNMENT OF TRANSPORTATION COMMAND
STATE OF TRANSPORT VEHICLE
TRAVELING STATE
IDLING
COLLECTING
TRANSPORTING
IDLING
ASSIGNED TRAVELING
LOADING
LOADED TRAVELING
UNLOADING
PROCESSING TIME (LEAD TIME)
CRANE
CONVEYOR
OCCURRENCE OF TRANSPORTATION REQUEST
COMPLETION OF UNLOADING

TRANSPORTATION SYSTEM AND TRANSPORTATION CONTROL METHOD

BACKGROUND OF THE INVENTION

1. Field of the Invention

The present invention relates to transportation systems and transportation control methods.

2. Description of the Related Art

Conventionally, a transportation system causing a plurality of transport vehicles to execute a load grabbing request has been known (for example, refer to WO 2019/198330). In this transportation system, among a plurality of load grabbing requests, a load grabbing request with the highest priority (the degree of priority for an article that is required to be transported earlier) is extracted, and a load grabbing command is allocated to a selected transport vehicle so as to cause it to execute the load grabbing request.

SUMMARY OF THE INVENTION

In the conventional transportation system described above, if it takes time to execute a prioritized transportation command, it may be difficult to execute a sufficient number of loads transported in the entire transportation system. The number of loads transported is, for example, the number of loads transported per unit time. There is a problem in that the number of loads transported is insufficient with respect to the number of transportation commands.

Example embodiments of the present invention provide transportation systems and transportation control methods that can each ensure a sufficient number of loads transported.

A transportation system according to an example embodiment of the present disclosure includes a plurality of transport vehicles and a controller configured or programmed to assign a transportation command to the transport vehicles, the controller being configured or programmed to execute specific assignment processing to preferentially assign the transportation command having a relatively short transportation time or transportation distance to the transport vehicles.

According to this transportation system, for example, when there are a plurality of the transportation commands, the controller executes the specific assignment processing. The specific assignment processing preferentially executes the transportation command having a relatively short transportation time or transportation distance. When the transportation time or the transportation distance is short, the transportation command is completed relatively early. This can increase the number of loads transported per unit time in the entire transportation system. Thus, this transportation system can ensure a sufficient number of loads transported. In addition, each transport vehicle is not restrained for a long period of time, and thus a certain number of idling vehicles (the transport vehicles that are in an idling state) can be ensured. In the present specification, the transport vehicle that is in the idling state may be a transport vehicle that is not in operation and, in other words, may be a transport vehicle to which the transportation command has not been allocated (including a transport vehicle having completed unloading).

The controller may assign the transportation command in ascending order of the transportation time or the transportation distance in the specific assignment processing. As the transportation time or the transportation distance becomes shorter, the transportation command is completed even earlier. Thus, when the transportation command with a shorter transportation time or transportation distance is executed more preferentially, the number of loads transported can be further increased.

The controller may suspend the transportation command having the transportation time or the transportation distance exceeding a certain value in the specific assignment processing. In this case, the transport vehicles do not execute the transportation command that is time-consuming (costly), and thus, the number of loads transported per unit time can be increased, thus increasing the number of loads transported.

The controller may execute the specific assignment processing under the condition that an operating rate of the transport vehicles is a threshold or more. The specific assignment processing is not always executed, but the specific assignment processing is executed only when the operating rate becomes the threshold or more. On the other hand, when the operating rate is low, the transportation command is assigned, for example, in order of being received (or generated) regardless of the transportation time or the transportation distance. Thus, appropriate assignment processing according to the conditions of the entire transportation system is enabled. Consequently, transportation efficiency in the transportation system improves. In addition, during normal operation, effects of easily handling the command with a long transportation time or transportation distance and making it difficult for the command to remain can also be expected.

The controller may select a transport vehicle capable of reaching first an article to be transported indicated in the transportation command among the transport vehicles and assign the transportation command to the transport vehicle in the specific assignment processing. In this case, loading and loaded traveling by the transport vehicles are started earlier. Thus, the transportation command can be completed even earlier.

Another example embodiment of the present disclosure is a transportation control method for, in a transportation system including a plurality of transport vehicles, assigning a transportation command to the transport vehicles, the transportation control method including preferentially assigning the transportation command having a relatively short transportation time or transportation distance to the transport vehicles.

According to this transportation control method, for example, when there are a plurality of the transportation commands, the specific assignment processing is executed. The specific assignment processing preferentially executes the transportation command having a relatively short transportation time or transportation distance. When the transportation time or the transportation distance is short, the transportation command is completed relatively early. This can increase the number of loads transported per unit time in the entire transportation system. Thus, this transportation control method can ensure a sufficient number of loads transported.

Example embodiments of the present disclosure ensure a sufficient number of loads transported.

The above and other elements, features, steps, characteristics and advantages of the present invention will become more apparent from the following detailed description of the example embodiments with reference to the attached drawings.

BRIEF DESCRIPTION OF THE DRAWINGS

FIG. 2 is a block diagram illustrating a functional configuration of a transportation system according to an example embodiment of the present invention.

DETAILED DESCRIPTION OF THE EXAMPLE EMBODIMENTS

Example embodiments of the present invention will now be described with reference to the attached drawings.

Figure 1:
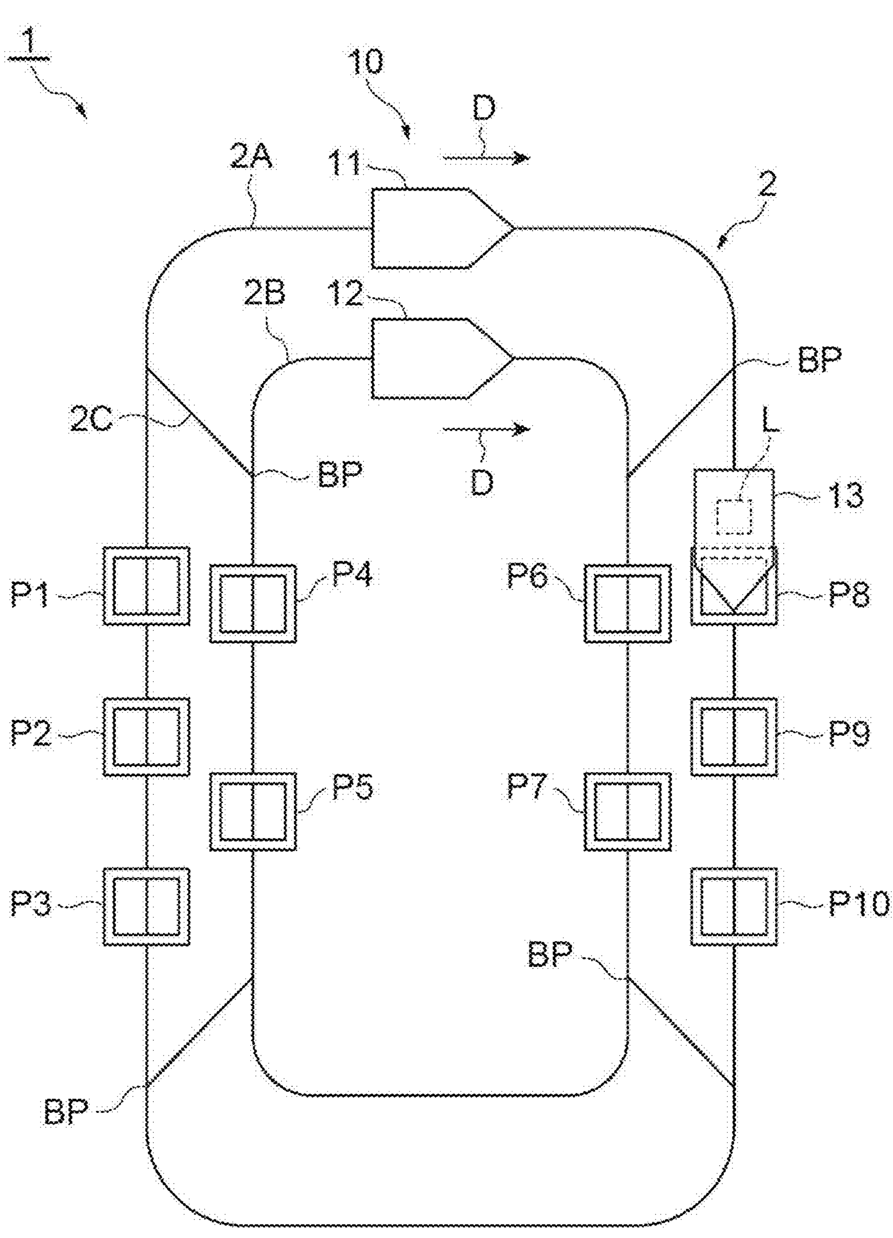
FIG. 1 is a schematic diagram illustrating a transportation example in a transportation system according to an example embodiment of the present invention.

A transportation system 1 illustrated in FIG. 1 and FIG. 2 is a system in which transport vehicles 10 travel along a track 2 laid on, for example, the ceiling of a factory or the like. The transportation system 1 is a transportation system transporting a load (article) L. The load L is, for example, a container storing a plurality of semiconductor wafers, but it may also be a glass substrate, a general component, or the like. The transportation system 1 mainly includes the track 2, a plurality of transport vehicles 11, 12, 13, . . . , a higher-level controller 5 (refer to FIG. 2), and a transport vehicle controller (a controller) 20. Hereafter, when collectively referring to the transport vehicles, they may be referred to as the transport vehicles 10, and when referring to individual transport vehicles, they may be referred to as the transport vehicle 11 (the transport vehicle 12 or the transport vehicle 13).

The track 2 is a traveling path set in advance for causing the transport vehicles 10 to travel. The track 2 is a one-way traveling path. In other words, in the transportation system 1, a traveling direction D (a forward direction) of the transport vehicles 10 on the track 2 is set to one direction as indicated by the arrow in FIG. 1, and traveling in the opposite direction is prohibited. The track 2 is hung from, for example, the ceiling of a factory or the like. The track 2 includes branch points BP. The branch points BP are points separating a branch path from a main path.

In the example of a track layout illustrated in FIG. 1, the track 2 includes two loop traveling paths 2A and 2B, and four connecting traveling paths 2C, which connect the loop traveling paths 2A and 2B to each other so as to enable the transport vehicles 10 to mutually come and go. At the positions where the connecting traveling paths 2C connect to the loop traveling path 2A (branch off from the loop traveling path 2A), the branch points BP are provided.

The transport vehicles 10 are configured to be capable of transferring the load L. The transport vehicles 10 are overhead traveling unmanned transport vehicles traveling along the track 2. The transport vehicles 10 are also referred to as, for example, carts (transport carts), traveling vehicles (traveling carts), or overhead traveling vehicles (overhead traveling carts). Below the track 2, for example, a plurality of load ports to grab and/or unload the load L (as an example, 10 load ports, or a first port P1 to a 10th port P10) are arranged. The transport vehicle 10 grabs the load L placed at any of the load ports and unloads the load L at any of the other loads as a transportation destination. The transport vehicle 10 includes a traveling unit causing the transport vehicle 10 to travel, a position acquisition unit configured to acquire the position of the transport vehicle 10 on the track 2, a vehicle controller configured or programmed to control the operation of the transport vehicle 10, a branch mechanism configured to switch the traveling direction of the transport vehicle 10 at the branch point BP, and the like (all of them are not illustrated).

Figure 3:
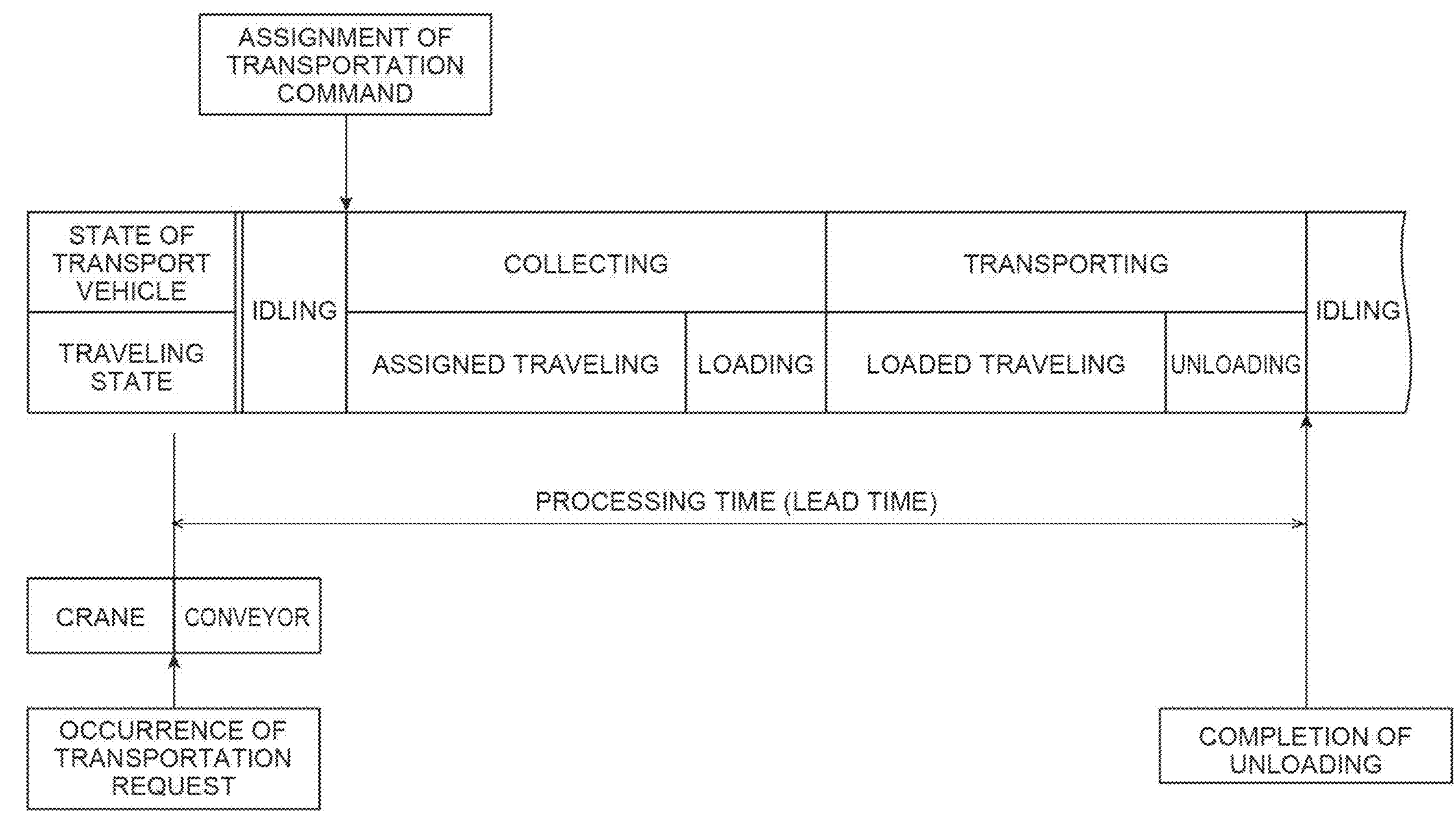
FIG. 3 is a diagram illustrating the definition of a transportation time (a processing time).

The transport vehicle 10 periodically transmits traveling information on the traveling state of the transport vehicle 10 to the transport vehicle controller 20. The traveling information is information indicating the state of the transport vehicle 10 itself. The traveling information includes at least position information of the transport vehicle 10, vehicle speed information of the transport vehicle 10, information on whether the load L is loaded, information on the traveling state of the transport vehicle 10, and, when the transport vehicle 10 is traveling, a scheduled traveling route related to the schedule of the traveling (a traveling plan). As illustrated in FIG. 3, the traveling state of the transport vehicle 10 includes assigned traveling, loading (load grabbing), loaded traveling, unloading, and the like.

The transport vehicle controller 20, for example, receives a transportation command corresponding to a load grabbing request to acquire the load L at any of the load ports (load grabbing ports). The higher-level controller 5 is, for example, a manufacture controller or the like. Examples of the load grabbing ports include load ports of processing apparatuses, check-in and check-out ports of stockers, and buffers as temporary storage locations for the load L. The load grabbing ports are also referred to as from ports. The method for generating the transportation command is not limited to a particular method, and various known methods can be used. The transport vehicle controller 20 may generate the transportation command in response to a load grabbing request from the higher-level controller 5 or the like and transmit the transportation command to a certain transport vehicle 10.

The transportation command includes at least a command to cause the transport vehicle 10 to travel to the position of the load grabbing port on the track 2, a command to cause the transport vehicle 10 to grab the load L at the load grabbing port, a command to cause the transport vehicle 10 to travel to the position of the unloading port in a loaded state on the track 2, and a command to cause the transport vehicle 10 to unload the load L at the unloading port. In normal assignment processing, which should be executed when the transportation system 1 is in a normal state, the transport vehicle controller 20 assigns the transportation command to a vacant transport vehicle among the transport vehicles 10. The vacant transport vehicle is the transport vehicle 10 to which the transportation command has not been assigned and includes the transport vehicle 10 that is vacant, which is not transporting the load L. Details of the normal assignment processing and other types of transportation control are described below.

The transportation system 1 of the present example embodiment is configured to be able to increase or maximize the number of loads transported (a workload) in the entire transportation system 1, for example, when the transport vehicle controller 20 has received (or generated) transportation commands. The number of loads transported or the workload is the number of transportation commands executed and completed per unit time. For this purpose, in addition to the normal assignment processing during the normal time, the transport vehicle controller 20 executes specific assignment processing that is different from the normal assignment processing in a certain transportation state in the entire transportation system 1. The transport vehicle controller 20 assigns the transportation command by considering a combination of the transport vehicles 11, 12, 13, . . . and the transportation command so that the number of loads transported can be increased or maximized. In the transportation system 1, the number of loads transported is improved by such transportation control.

As illustrated in FIG. 2, the transport vehicle controller 20 is configured or programmed to include a transportation command transmitter and receiver 21, a transportation state determination unit 23, an operating rate calculation unit 24, an operating rate determination unit 25, an assignment processing unit 26, a transportation command table 27, a system state table 28, and an assignment result table 29. The transport vehicle controller 20 may be an electronic control unit including a processor such as a central processing unit (CPU), a read only memory (ROM), a random access memory (RAM), and the like.

The transportation command transmitter and receiver 21 receives the transportation command indicating a load grabbing request for the load L from the higher-level controller 5. A plurality of the transportation commands can be transmitted simultaneously or sequentially from the higher-level controller 5. The transportation command transmitter and receiver 21 stores the received transportation command in the transportation command table 27. The transportation command table 27 stores therein one or more transportation commands. The transportation command for which allocation processing by the assignment processing unit 26 has been completed may be deleted from the transportation command table 27 or the processed transportation command may be managed separately from the transportation command for which the allocation processing has not been completed.

The transportation state determination unit 23 determines whether the state of the transportation command stored in the transportation command table 27 has changed. The transportation state determination unit 23 determines that the transportation state has changed if, for example, the transportation command stored in the transportation command table 27 has changed since the previous determination (for example, if a new transportation command has been stored). Note that the transportation state determination unit 23 may determine that the transportation state has changed if a certain amount of time has elapsed since the previous determination (even if no new transportation command has been stored). The transportation state determination unit 23 may also have the function of a vehicle transmitter and receiver configured to acquire vehicle state information from the transport vehicles 10 through polling communication. In that case, the transportation state determination unit 23 stores the acquired vehicle state information in the system state table 28. In addition to the vehicle state information, the system state table 28 may also store therein the state of paths or buffers (storage shelves called OHBs) and the like.

The operating rate calculation unit 24 calculates an operating rate of the transport vehicles 10 in the entire transportation system 1. The denominator, or population, in the calculation of the "operating rate" is the total number of the transport vehicles 10 in the transportation system 1, and the numerator in the calculation of the "operating rate" is, for example, the number of transport vehicles 10 that are collecting or transporting the load L (refer to FIG. 3). The numerator in the calculation of the "operating rate" is, in other words, the number of the transport vehicles 10 to which the transportation command has been allocated, the transport vehicles 10 having not yet completed unloading.

The operating rate determination unit 25 determines whether the current operating rate in the transportation system 1 is a certain threshold or more based on the operating rate calculated by the operating rate calculation unit 24. The operating rate determination unit 25 stores therein the certain threshold about the operating rate. The threshold may be, for example, a value between about 5% and about 30% or a value between about 10% and about 20%. The threshold stored in the operating rate determination unit 25 and used for the determination may be set or changed as appropriate. The operating rate determination unit 25 determines that the current operating rate is the threshold or more if the operating rate calculated by the operating rate calculation unit 24 is the threshold or more. The operating rate determination unit 25 determines that the current operating rate is not the threshold or more if the operating rate calculated by the operating rate calculation unit 24 is less than the threshold. Although the operating rate determination unit 25 of the present example embodiment uses the "operating rate" as an indicator, the determination may be performed with an "idling rate" as an indicator, as opposed to the "operating rate." The transport vehicle 10 that is in an idling state is the transport vehicle 10 to which the transportation command has not been allocated and the transport vehicle 10 having completed unloading.

The relationship that idling rate = 100 − operating rate (%) holds.

The transportation state determination unit 23, the operating rate calculation unit 24, and the operating rate determination unit 25 define a system state determination unit 22 configured to manage various indicators such as a vehicle operating rate and determine a system state. The various indicators are, for example, system performance indicators including a transportation lead time (a moving average) and/or the number of loads transported completed per unit time. The system state determination unit 22 refers to the system state table 28 to manage the various indicators and determine the system state.

The assignment processing unit 26 performs either one control out of the normal assignment processing and the specific assignment processing based on a determination result in the operating rate determination unit 25. The normal assignment processing executed by the assignment processing unit 26 is known assignment processing (or allocation processing). On the other hand, the specific assignment processing executed by the assignment processing unit 26 is assignment processing (or allocation processing) unique to the present example embodiment and is control that places emphasis on the number of loads transported in the entire system. The assignment processing unit 26, for example, stores therein a certain value (a cost threshold) about a lead time (a transportation cost). Each transportation command has a cost related to a transportation time or a transportation distance as the transportation cost. The assignment processing unit 26 subjects only the transportation command having the transportation cost related to the transportation time or the transportation distance of a certain value or less among the transportation commands to the assignment processing in the specific assignment processing. More specifically, for example, the assignment processing unit 26 arranges a plurality of transportation commands subjected to the assignment processing in descending order of the transportation cost and assigns the transportation command in order from the top (in ascending order of the transportation cost). Transportation control by the assignment processing unit 26 is described in detail in the description of the transportation control method. Note that the concept of being "large" or "small" about the transportation cost is equivalent to the concept of being "long" or "short." The reason for this is that the transportation cost is a cost related to the transportation time or the transportation distance. The assignment processing unit 26 stores assignment results of the normal assignment processing and the specific assignment processing in the assignment result table 29. Although not illustrated in the drawing, a transmitter configured to transmit the transportation command to the transport vehicles 10 is provided.

The cost (the transportation cost) related to the transportation time or the transportation distance of each transportation command may be a value calculated by the transport vehicle controller 20. In that case, the transport vehicle controller 20 may calculate the cost of each transportation command by considering the traveling state of the transport vehicles 10 on the track 2, the position and distribution of vacant transport vehicles, and the like.

Next, the following describes the definition of the transportation time (a processing time) with reference to FIG. 3. The top row of FIG. 3 shows the state of the transport vehicle 10, and the bottom row shows a traveling state. As to the state of the transport vehicle 10, "collecting" (also referred to as "retrieving") indicates a state from assigned traveling to the completion of loading. "Transporting" (also referred to as delivering) indicates a state from loaded traveling to the completion of unloading. Meanwhile, after a load grabbing request occurs at a conveyor end (the boundary between a crane and a conveyor), the time including an idling time, a collecting time during which the transport vehicle 10 is in a collection state, and a transportation time during which the transport vehicle 10 is in a transportation state is the processing time, that is, the lead time. The present example embodiment uses the certain value (the cost threshold) about the lead time of each transportation command.

Figure 4:
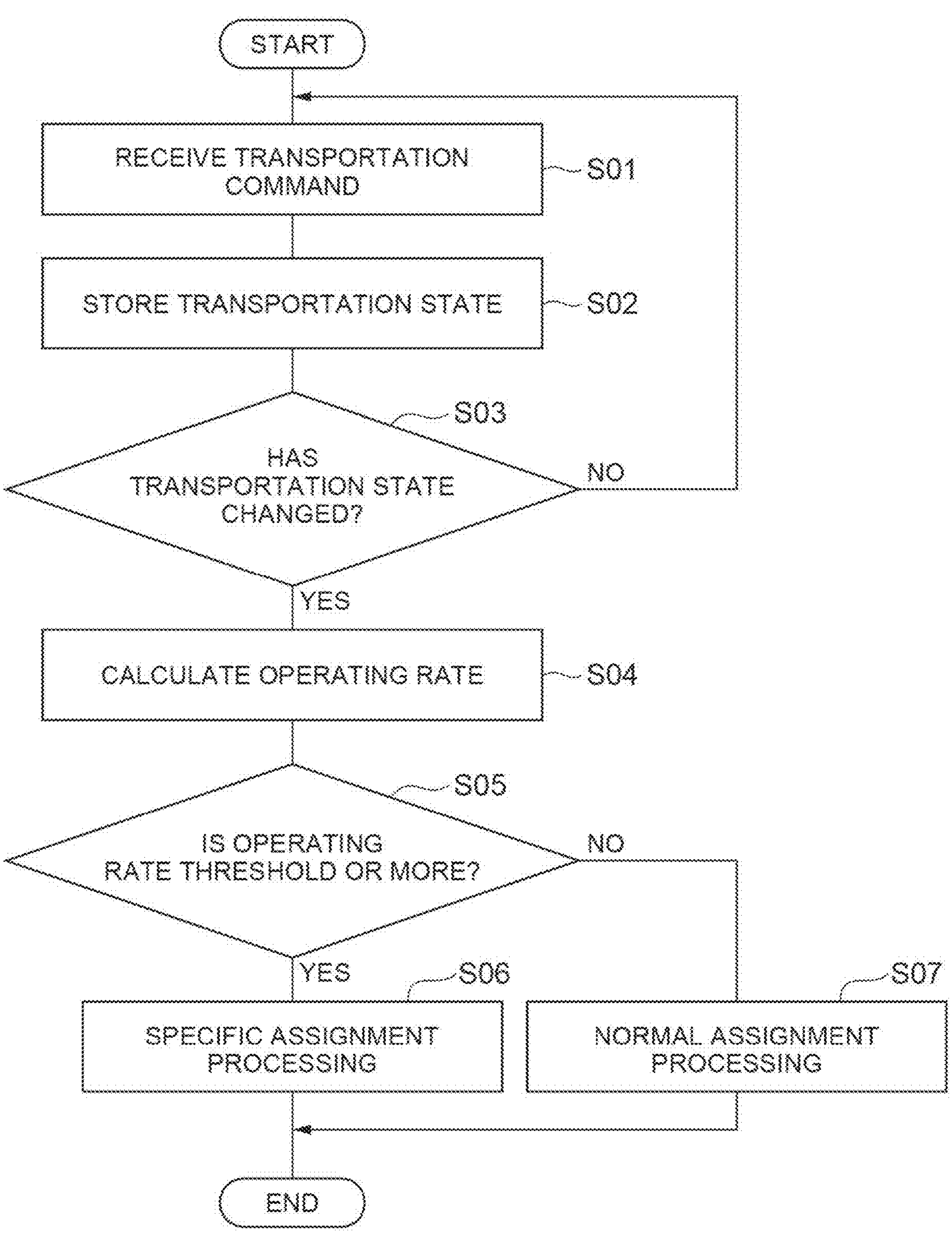
FIG. 4 is a flowchart illustrating a transportation control method according to an example embodiment of the present invention.
Figure 5:
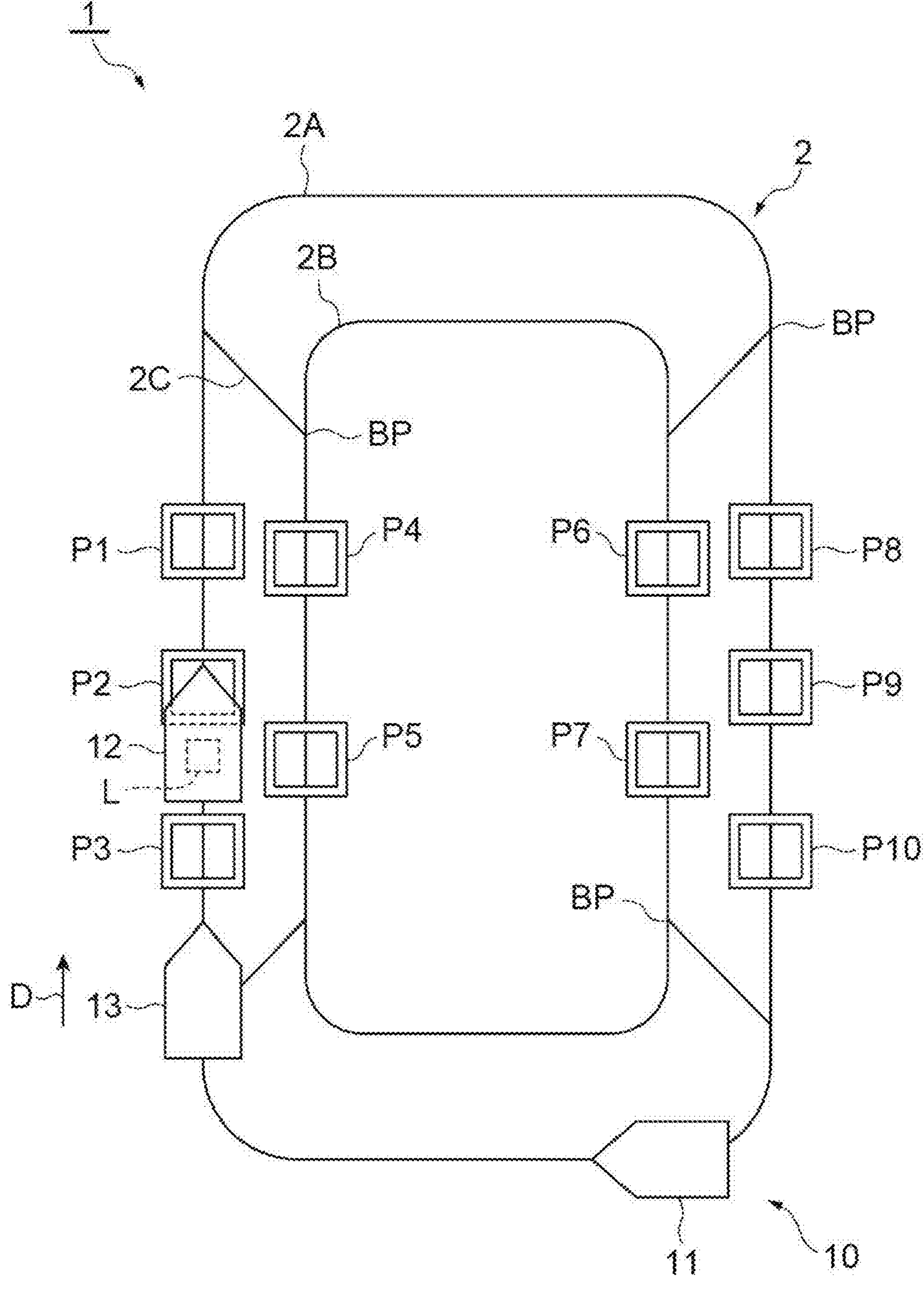
FIG. 5 is a schematic diagram illustrating another transportation example in a transportation system according to an example embodiment of the present invention.

Next, the following describes a processing procedure in the transportation system 1 of the present example embodiment (the transportation control method) with reference to FIG. 1, FIG. 4, and FIG. 5. First, as illustrated in FIG. 3, the transportation command transmitter and receiver 21 of the transport vehicle controller 20 receives a load grabbing request from the higher-level controller a transportation command in response to the load grabbing request (Step S01). Next, the transportation command transmitter and receiver 21 sequentially stores the received transportation command in the transportation command table 27 (Step S02). Next, the transportation state determination unit 23 determines whether the state of the transportation command has changed (Step S03). The transportation state determination unit 23 determines that the transportation state has changed if the transportation command stored in the transportation command table 27 has changed since the previous determination (Step S03; YES). For example, if a new transportation command is stored in the transportation command table 27 compared to that in the previous determination, the transportation state determination unit 23 determines that the transportation state has changed. Note that the transportation state determination unit 23 may determine that the transportation state has changed if a certain amount of time has elapsed since the previous determination (even if no new transportation command has been stored). In that case, routing to the two types of assignment processing in Step S04 to Step S07 becomes a fixed-cycle event.

In Step S03, if the transportation command stored in the transportation command table 27 is the same as that in the previous determination, the transportation state determination unit 23 determines that the transportation state has not changed (Step S03; NO). In that case, the process returns to the processing in Step S01.

If it is determined in Step S03 that the transportation state has changed, the operating rate calculation unit 24 calculates the current operating rate in the transportation system 1 (Step S04). Next, the operating rate determination unit 25 determines whether the operating rate is the threshold or more (Step S05). The operating rate determination unit 25 compares the operating rate calculated in Step S04 with the threshold stored in advance. The threshold is, for example, a value within the range described above. If the operating rate determination unit 25 determines that the operating rate is the threshold or more (Step S05; YES), the specific assignment processing by the assignment processing unit 26 is executed (Step S06). Thus, the transport vehicle controller 20 executes the specific assignment processing under the condition that the operating rate of the transport vehicles 10 is the threshold or more. On the other hand, if the operating rate determination unit 25 determines that the operating rate is not the threshold or more (less than the threshold) (Step S05; NO), the normal assignment processing by the assignment processing unit 26 is executed (Step S07).

In the normal assignment processing in Step S07, the assignment processing unit 26 assigns the transportation command to the vacant transport vehicle among the transport vehicles 10. The transportation command is assigned, for example, in order of being received or generated. In this case, the assignment processing unit 26, for example, selects the transport vehicle 10 capable of reaching first the load L to be transported indicated in the transportation command among the transport vehicles 10 and assigns the transportation command to the transport vehicle 10.

The following describes the specific assignment processing in Step S06 with reference to FIG. 1 and FIG. 5. In the specific assignment processing, the assignment processing unit 26 subjects only the transportation command having the transportation cost related to the transportation time or the transportation distance smaller than the threshold among the transportation commands to the assignment processing. The assignment processing unit 26, for example, arranges a plurality of transportation commands subjected to the assignment processing in descending order of the transportation cost and assigns the transportation command in order from the top (in ascending order of the transportation cost). For example, in the state illustrated in FIG. 1, the transport vehicle 11 is idling, the transport vehicle 12 is idling, and the transport vehicle 13 is loaded traveling toward the ninth port P9, which is an unloading port.

At a time t in the state illustrated in FIG. 1, three transportation commands T1, T2, and T3 are generated. The load grabbing port, the unloading port, and the transportation cost of each transportation command are as follows:

T1: a transportation command from the 10th port P10 to an external port (outside the bay)

The transportation cost=120

T2: a transportation command from the fifth port P5 to an external port (outside the bay)

The transportation cost=90

T3: a transportation command from the third port P3 to the seventh port P7

The transportation cost=15

In this case, for example, the assignment processing unit 26 stores therein “90” as the certain value. The assignment processing unit 26 does not perform the assignment processing on T1 and T2 because T1 and T2 exceed the certain value. That is, the transport vehicle controller 20 suspends the transportation command having the transportation time or the transportation distance exceeding the certain value in the specific assignment processing. The assignment processing unit 26 assigns the transportation command T3 to the transport vehicle 12 because the transport vehicle 12 can reach the seventh port P7 earlier than the transport vehicle 13. That is, the assignment processing unit 26 selects the transport vehicle 10 capable of reaching first the load L to be transported indicated in the transportation command among the transport vehicles 10 and assigns the transportation command to the transport vehicle 10.

The following describes another example with reference to FIG. 5. FIG. 5, for example, illustrates a state that can occur immediately after the state illustrated in FIG. 1. In the state illustrated in FIG. 5, the transport vehicle 11 is idling, the transport vehicle 12 is loaded traveling toward the seventh port P7, which is an unloading port, (executing T3 above), and the transport vehicle 13 is idling.

At a time t+15 of the state illustrated in FIG. 5, four transportation commands T4, T5, T1, and T2 are generated. The load grabbing port, the unloading port, and the transportation cost of each transportation command are as follows:

T4: a transportation command from the first port P1 to the sixth port P6

The transportation cost=15

T5: a transportation command from the second port P2 to the fourth port P4

The transportation cost=30

T1: the transportation command from the 10th port P10 to an external port (outside Bay)

The transportation cost=120

T2: the transportation command from the fifth port P5 to an external port (outside Bay)

The transportation cost=90

In this case, the assignment processing unit 26 does not perform the assignment processing on T1 and T2 because T1 and T2 exceed the certain value. That is, the transport vehicle controller 20 suspends the transportation command having the transportation time or the transportation distance exceeding the certain value in the specific assignment processing. The assignment processing unit 26 determines that, about T4 and T5, their arrangement enables simultaneous transfer and assigns the transportation command T4 to the transport vehicle 13 and assigns the transportation command T5 to the transport vehicle 11. In this case too, the assignment processing unit 26 selects the transport vehicle 10 capable of reaching first the load L to be transported indicated in the transportation command among the transport vehicles 10 and assigns the transportation command to the transport vehicle 10.

Through the above flow of transportation control, the transportation command having a short transportation time or transportation distances is preferentially processed, thereby increasing or maximizing the number of loads transported.

According to the transportation system 1 and the transportation control method of the present example embodiment, when there are a plurality of the transportation commands, the transport vehicle controller 20 executes the specific assignment processing. The specific assignment processing preferentially executes the transportation command having a relatively short transportation time or transportation distance. When the transportation time or the transportation distance is short, the transportation command is completed relatively early. This can increase the number of loads transported per unit time in the entire transportation system 1. Thus, this transportation system 1 and transportation control method can ensure a sufficient number of loads transported. In addition, each transport vehicle is not restrained for a long period of time, and thus a certain number of idling vehicles can be secured.

In conventional transportation systems and transportation control methods, for example, in the state illustrated in FIG. 1, there was a possibility that T1 was assigned to the transport vehicle 13, T2 to the transport vehicle 12, and T3 to the transport vehicle 11. In the state illustrated in FIG. 5, there was a possibility that both the transport vehicle 11 and the transport vehicle 12 were traveling with the load grabbed, and the transport vehicle 13 was in the process of grabbing the load at the tenth port P10. In that case, there was a possibility that neither T4 nor T5 was executed (in this case, swapping processing could not be executed either). The present example embodiment avoids such a situation, and T4 and T5 are executed earlier. Thus, the number of loads transported can be increased or maximized.

Note that the lead time statistics may deteriorate, but the number of loads transported is avoided from being reduced, and thus such a disadvantage is said to be relatively small.

The present example embodiment can accumulate data such as the operating rate based on the results of execution of the specific assignment processing, the number r of transportation commands allocated, and the number of unallocated transportation commands.

The transport vehicle controller 20 assigns the transportation command in ascending order of the transportation time or the transportation distance in the specific assignment processing. When the transportation command with a shorter transportation time or transportation distance is executed more preferentially, the number of loads transported can be further increased.

The transport vehicle controller 20 suspends the transportation command having the transportation time or the transportation distance exceeding the certain value in the specific assignment processing. The transport vehicles 10 do not execute the transportation command that is time-consuming (costly), and thus the number of loads transported per unit time can be increased, thus further increasing the number of loads transported.

The transport vehicle controller 20 executes the specific assignment processing under the condition that the operating rate of the transport vehicles 10 is the threshold or more. That is, the specific assignment processing is not always executed, but the specific assignment processing is executed only when the operating rate becomes the threshold or more. On the other hand, when the operating rate is low (in the case of Step S05; NO), the transportation command is assigned, for example, in order of being received (or generated) regardless of the transportation time or the transportation distance. Thus, appropriate assignment processing according to the conditions of the entire transportation system 1 is enabled. Consequently, transportation efficiency in the transportation system 1 improves. In addition, during normal operation, effects of easily handling the command with a long transportation time or transportation distance and making it difficult for the command to remain can also be expected.

The transport vehicle controller 20 selects the transport vehicle 10 capable of reaching first the load L to be transported indicated in the transportation command among the transport vehicles 10 and assigns the transportation command to the transport vehicle 10 in the specific assignment processing. This starts loading and loaded traveling by the transport vehicles 10 earlier. Thus, the transportation command can be completed even earlier.

Although example embodiments according to the present invention has been described above, the present invention is not limited to the above-described example embodiments. For example, in the above example embodiments, the controller suspends the transportation command having the transportation time or the transportation distance exceeding the certain value and assigns the transportation command in ascending order of the transportation time or the transportation distance in the specific assignment processing. Not limited to this example, the controller may suspend the transportation command having the transportation time or the transportation distance exceeding the certain value and assign the transportation command regardless of the transportation time or the transportation distance in the specific assignment processing. The controller may determine the order of assignment based on other factors. The controller only needs to preferentially assign the transportation command having a relatively short transportation time or transportation distance. Alternatively, the controller may allow the transportation command having the transportation time or the transportation distance exceeding the certain value to be processed (not suspend it) and assign the transportation command in ascending of the transportation time or the transportation distance in the specific assignment processing.

To keep the worst-case lead time at a certain level or less, the controller may execute a relief measure. That is, the controller may forcibly assign the transportation command if a certain condition is satisfied regardless of the length of the transportation time or the transportation distance (even if the transportation time or the transportation distance is long enough to exceed the certain value).

In the above example embodiments, the certain value (the cost threshold) related to the lead time of each transportation command is used, but differently from this, another certain value (cost threshold) related to a waiting time may be used. Alternatively, the certain value about the lead time and the other certain value about the waiting time may be used together.

When the operating rate has increased to a certain level or more, the step of determining the operating rate (Step S05) may be omitted. When vehicle balance control is turned off or reduced, the transport vehicles 10 that are in the idling state can be dispersed.

In addition to the specific allocation processing, reservation processing and/or swapping processing as known pieces of transportation control may be combined with each other. These pieces of processing can be executed based on the positions of the load grabbing ports and the unloading ports and the positions of the transport vehicles 10.

The execution criteria for executing the specific assignment processing are not limited to the above example embodiments. For example, when the priority of transportation is separately controlled at the factory or the like (the user side), or when special commands are used, a different threshold or the like may be provided, and the specific assignment processing may be performed only when the threshold is exceeded. Control based on the circumstances of the factory or the like (the user side) may be caused to interrupt the specific assignment control of the above example embodiments with appropriate determination criteria and timing.

The track layout in which a transportation system according to an example embodiment of the present disclosure is used is not limited to the example in FIG. 1 (FIG. 5), and various track layouts can be used. In the above example embodiments, the overhead traveling vehicles are described as an example of the transport vehicles 10, but other examples of the traveling vehicles include unmanned traveling vehicles and stacker cranes configured to travel on tracks laid on the ground or platforms.

While example embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transportation system comprising:
- a plurality of transport vehicles; and
- a controller configured or programmed to assign a transportation command to the transport vehicles; wherein
- the controller is configured or programmed to execute specific assignment processing to preferentially assign the transportation command having a relatively short transportation time or transportation distance to the transport vehicles; and
- the controller is configured or programmed to execute the specific assignment processing under a condition that an operating rate of the transport vehicles, which corresponds to a ratio of a number of the transport vehicles collecting or transporting an article to a total number of the transport vehicles in the transportation system, is equal to or greater than a threshold, and to then cause a selected transport vehicle, from among the transport vehicles, to transport based on the specific assignment processing.

2. The transportation system according to claim 1, wherein the controller is configured or programmed to assign the transportation command in ascending order of the transportation time or the transportation distance in the specific assignment processing.

3. The transportation system according to claim 1, wherein the controller is configured or programmed to suspend the transportation command having the transportation time or the transportation distance exceeding a certain value in the specific assignment processing.

4. The transportation system according to claim 1, wherein the selected transport vehicle is a transport vehicle, from among the transport vehicles, capable of reaching first an article to be transported indicated in the transportation command.

5. A transportation control method for, in a transportation system including a plurality of transport vehicles, the transportation control method comprising:
- assigning a transportation command to the transport vehicles including preferentially assigning the transportation command having a relatively short transportation time or transportation distance to the transport vehicles;
- executing a specific assignment process under a condition that an operating rate of the transport vehicles, which corresponds to a ratio of a number of the transport vehicles collecting or transporting an article to a total number of the transport vehicles in the transportation system, is equal to or greater than a threshold; and causing a selected transport vehicle, from among the transport vehicles, to transport based on the specific assignment process.

* * * * *